US006219907B1

(12) United States Patent
Frye

(10) Patent No.: US 6,219,907 B1
(45) Date of Patent: Apr. 24, 2001

(54) HAND-HELD APPARATUS FOR INSTALLING FLASHOVER PROTECTION COVERS ON ENERGIZED ELECTRICAL CONDUCTORS AND EQUIPMENT

(75) Inventor: Terry Edward Frye, Cary, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/415,828

(22) Filed: Oct. 12, 1999

(51) Int. Cl.$^7$ ..................................................... H01R 43/22
(52) U.S. Cl. ................. 29/825; 29/235; 29/745; 29/33 K; 254/134.3 R; 174/5 R
(58) Field of Search ..................... 174/1, 2, 4 R, 174/5 SG, 5 R, 70 A, 135, 5 SB, 136; 29/235, 237, 745, 758, 33 K, 825; 254/133 R, 134

(56) References Cited

U.S. PATENT DOCUMENTS

| 3,840,716 | 10/1974 | Sommerman | 200/148 R |
| 4,267,628 | 5/1981 | Izraeli | 29/235 |
| 4,280,013 | 7/1981 | Clutter | 174/5 R |
| 4,454,999 | 6/1984 | Woodruff | 242/86.5 R |
| 4,965,930 | 10/1990 | Wnukowski | 29/758 |
| 5,794,495 | 8/1998 | Anderson | 81/53.1 |
| 6,020,560 | 2/2000 | Kamel et al. | 174/138 R |

FOREIGN PATENT DOCUMENTS

| 502410 | 12/1926 | (DE) . | |
| 1976232A1 | 5/1998 | (DE) | B65D/71/00 |
| 842240 | 7/1960 | (GB) . | |
| 08182135 | 7/1996 | (JP) | H02G/1/02 |
| 8-182164 | 7/1996 | (JP) | H02G/07/00 |
| 7603441 | 10/1977 | (NL) | H02G/03/28 |
| WO 99/30399 | 6/1999 | (WO) | H02G/07/00 |

OTHER PUBLICATIONS

International Search Report, International Application Serial No. PCT/US00/26930, dated January 10, 2001.

Primary Examiner—Dean A. Reichard
Assistant Examiner—Adolfo Nino
(74) Attorney, Agent, or Firm—Myers Bigel Sibley & Sajovec

(57) ABSTRACT

Hand-held devices that can be used to quickly install flashover protection covers around energized electrical conductors and equipment are provided. Each device includes a guide assembly that defines a pair of spaced-apart, converging passageways that are configured to slidably receive the elongated edge portions of a flexible panel therethrough. The converging passageways force together the opposite edge portions of a flexible panel being advanced through the guide assembly.

28 Claims, 9 Drawing Sheets

HAND-HELD APPARATUS FOR INSTALLING FLASHOVER PROTECTION COVERS ON ENERGIZED ELECTRICAL CONDUCTORS AND EQUIPMENT

FIELD OF THE INVENTION

The present invention relates generally to insulating covers and, more particularly, to devices for installing insulating covers.

BACKGROUND OF THE INVENTION

Electrical power may be transmitted from a generation source to consumers via overhead conductors strung between towers or poles. Electrical power is conventionally transmitted in phases wherein multiple conductors are utilized. One or more of these conductors may be a "hot" conductor that carries a specified amount of alternating current electric power. Flashover may result if contact is made between two hot conductors or between a hot conductor and ground. Non-grounded contact with a hot conductor, such as when a bird sits upon a hot conductor, typically does not result in flashover.

The transmission of electrical power from a generation source to residential areas typically involves a combination of transmission devices which make up a transmission system. In a typical transmission system, power is generated by a power plant such as a hydroelectric installation, a steam installation or a nuclear plant. The output from a power plant generator is normally about 25 kilovolts (kv). The output from a power plant generator is typically transmitted to a step-up substation where the voltage is increased to a transmission line voltage of 230 kv or higher. The next substation encountered is typically a transmission substation where the transmission voltage is decreased from the transmission line voltage to a sub-transmission voltage of approximately 69 kv. A distribution substation is then typically used to step the voltage down from the transmission voltage to a distribution voltage of about 5 to 35 kv. The distribution voltage is the voltage that is transmitted to a residential area, either through overhead or underground distribution systems. Single phase transformers are typically provided at the residential level to reduce voltage to a 240–120 volt, single phase, three wire residential power entrance.

Because uninsulated conductors are typically less expensive than insulated conductors, many electric power suppliers utilize uninsulated conductors for the transmission and distribution of electric power. Although uninsulated conductors may be less expensive to install than insulated conductors, potentially costly problems may arise from the use of uninsulated conductors. Adequate clearances between conductors and/or other grounded objects may not be sustainable during adverse weather conditions (i.e., storms and high winds). As a result, the potential for flashover caused by uninsulated conductors contacting each other or other objects may be increased. Another source of flashover may be caused by large birds and animals which have sufficient size to make contact with a hot conductor and a grounded object or another conductor. In addition, falling trees and tree branches may cause contact between hot conductors and ground which may result in flashover.

Substations typically include various steel structures for supporting power transmission and distribution equipment, such as circuit breakers, transformers, capacitors, regulators, hook switches and the like. Uninsulated conductors typically extend between the equipment in a substation in various directions and configurations. Because workers often work in close proximity to the equipment in a substation, it is typically desirable to cover at least some portions of the uninsulated conductors as well as grounded structures in the vicinity of uninsulated conductors.

Flashover may result in power outages which are undesirable to electric power suppliers and to consumers. For existing power transmission and distribution systems, electric power suppliers may find it desirable to replace uninsulated conductors with insulated ones in order to reduce the likelihood of flashover. Unfortunately, the cost of replacing uninsulated conductors with insulated conductors may be expensive. Furthermore, an interruption in the delivery of power may be required to replace uninsulated conductors. This may be economically disadvantageous to an electric power supplier as well as being undesirable to electric power consumers.

Insulating covers for protecting workers from hot, uninsulated conductors, as well as for protecting against flashover, are available. These covers conventionally include thick rubber tubing, heat-shrinkable tape, and wrap-around covers. Unfortunately, there are drawbacks associated with installation methods for each of these types of covers. Thick rubber tubing can be somewhat bulky and difficult to install. Furthermore, tubing covers may require that a conductor be disconnected from service so that the conductor can be inserted through the tubing. Such electrical power service interruptions may be economically disadvantageous to an electric power supplier as well as being undesirable to electric power consumers.

The use of heat-shrinkable tape typically requires the use of a torch or other heat source for shrinking the tape to a conductor. The use of a torch or other heat source, particularly around substation equipment, is generally undesirable and can be labor intensive. Wrap-around covers typically do not snap together and typically are secured to a conductor or other structure using ties. Unfortunately, this method can be a somewhat labor intensive process as well.

Insulating covers are available that do not require that a conductor be removed from service. These covers are typically flexible panels having elongated opposite edge portions that are configured to be joined together to enclose a conductor or other elongated structure. Unfortunately, operations for joining the edges together on these types of covers can be labor intensive.

SUMMARY OF THE INVENTION

It is, therefore, an object of the present invention to provide hand-held devices that allow a user to quickly join the edges of flashover protection covers together.

It is another object of the present invention to provide hand-held devices that allow a user to quickly install flashover protection covers on energized conductors without requiring that the conductors be removed from service during installation.

These and other objects of the present invention are provided by hand-held devices that can be used to quickly install flashover protection covers around energized electrical conductors and other equipment. A hand-held cover installation device according to the present invention includes a rigid frame having opposite sides. A guide assembly is secured to one side and a handle is secured to the other side of the rigid frame. The guide assembly includes an elongated bottom wall having opposite first and second ends. A pair of spaced-apart, elongated side walls extend upwardly from the bottom wall. The side walls converge towards the bottom wall first end to define a guide assembly outlet and diverge towards the bottom wall second end to define a guide assembly inlet.

The guide assembly includes a partition that aligns the various portions of a flexible panel passing through the guide assembly during installation of a cover. According to one embodiment of the present invention, the partition includes a base member that extends upwardly from the bottom wall between the elongated side walls. An elongated top wall is transversely connected to the base member so as to be maintained in spaced-apart relationship with the bottom wall. The guide assembly defines a pair of spaced-apart, converging passageways that are configured to slidably receive the elongated edge portions of a flexible panel therethrough. The converging passageways force together the opposite edge portions of a flexible panel being advanced through the guide assembly.

Hand-held devices according to the present invention are particularly advantageous because they are lightweight and easy to use. With a single arm motion, the edge portions of a cover surrounding an energized conductor or other structure can be joined together. As such, flashover protection covers can be installed on energized conductors and equipment safely and quickly.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the discussion of the drawings.

Flashover Protection Covers

Figure 1:
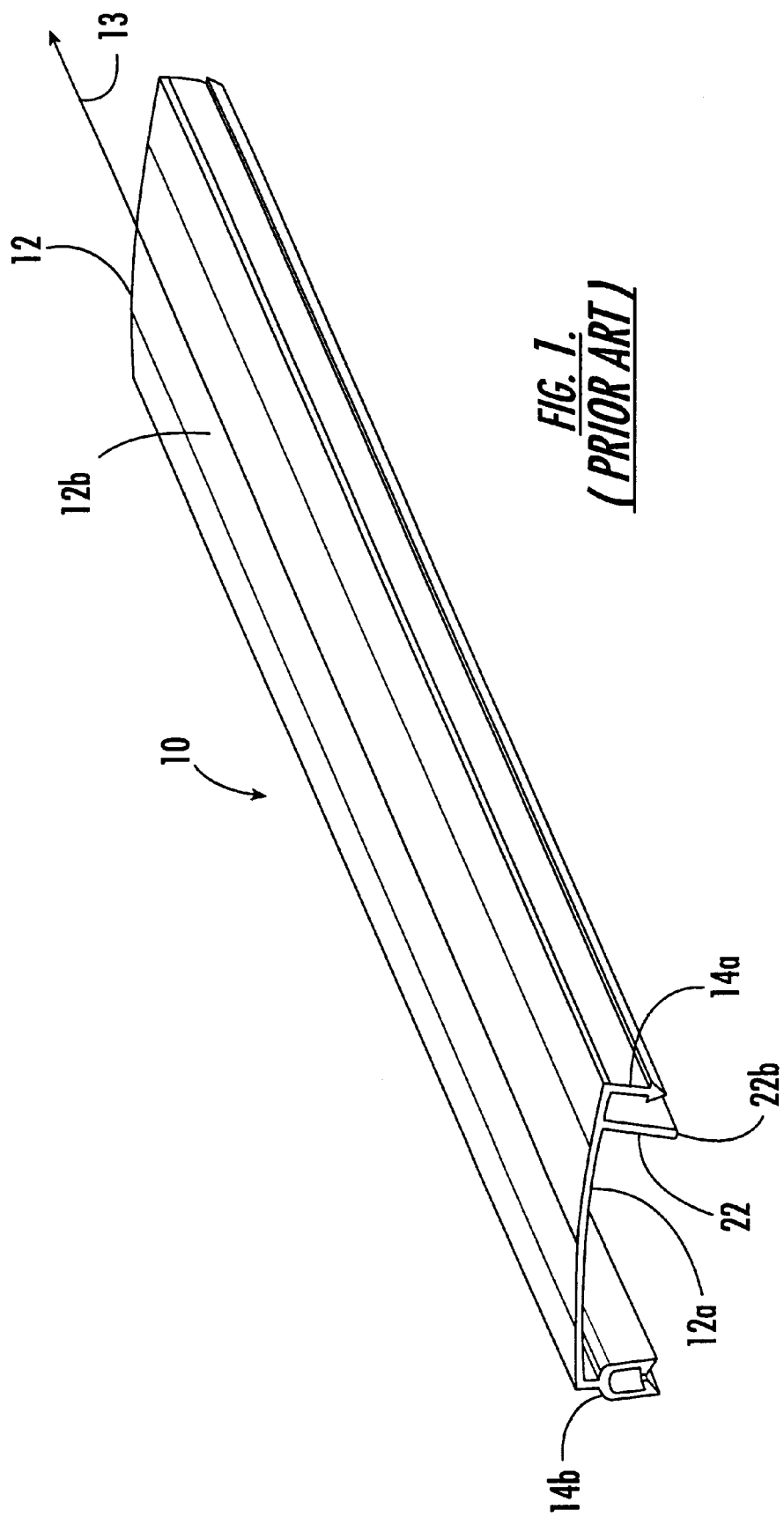
FIG. 1 is a perspective view of an exemplary flashover protection cover, in an uninstalled configuration.
Figure 2:
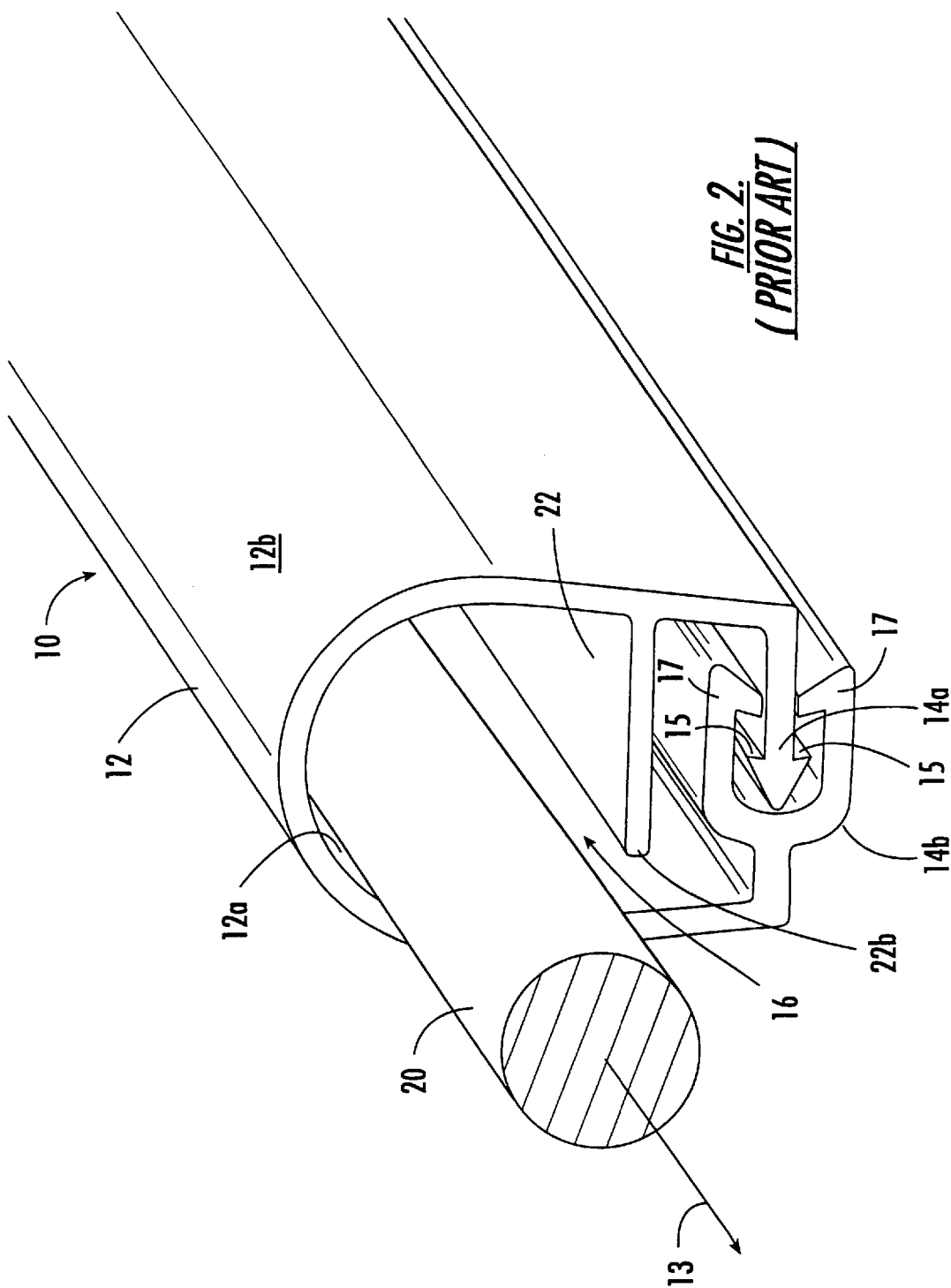
FIG. 2 is a perspective view of the flashover protection cover of FIG. 1 in an installed configuration surrounding an electrical conductor.
Figure 3:
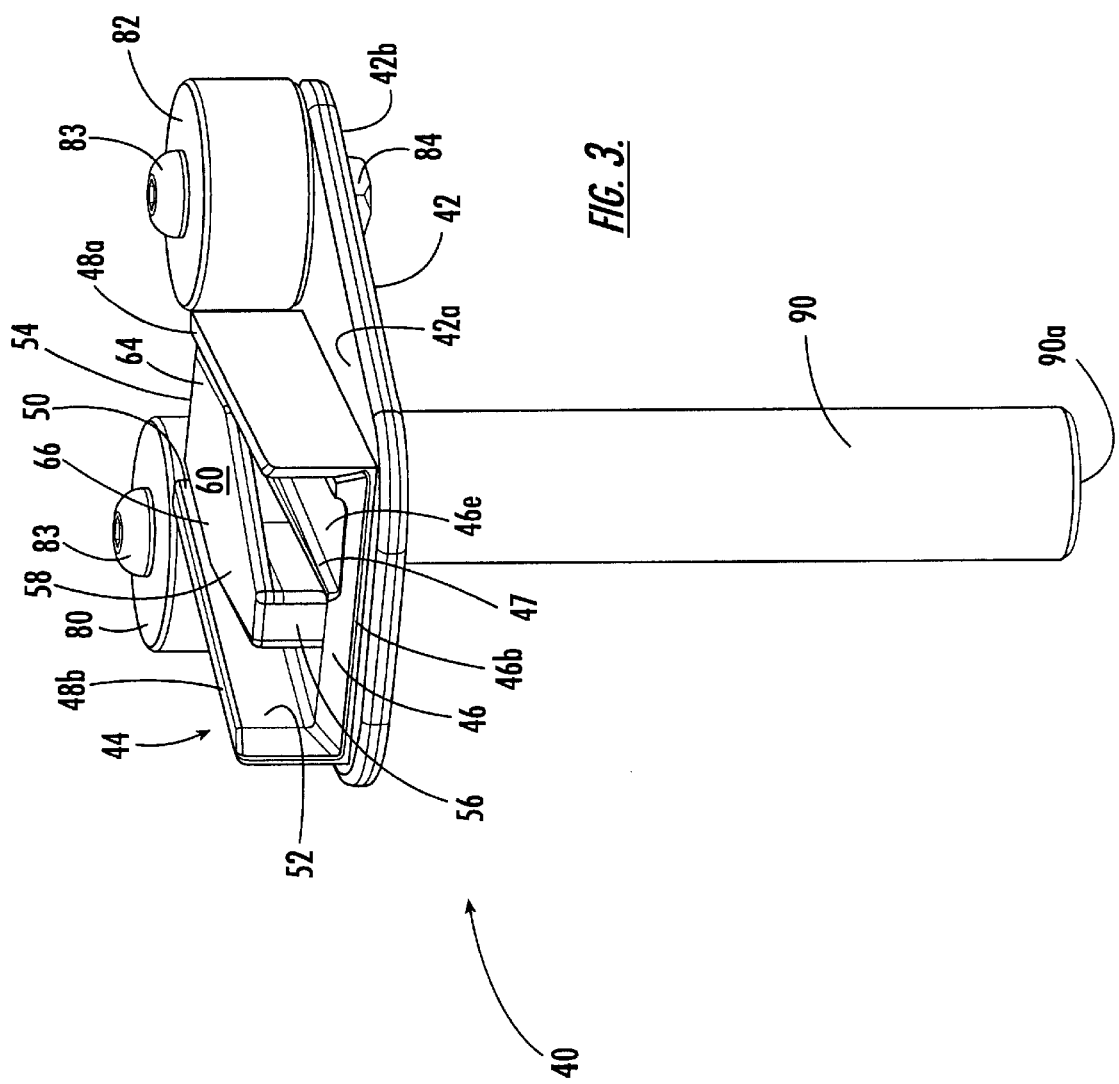
FIG. 3 is a front perspective view of a handheld device for installing flashover protection covers according to the present invention, wherein the guide assembly inlet is illustrated.

Referring now to FIGS. 1–2, an exemplary flashover protection cover 10 for covering an energized conductor, or other structure, is illustrated in an uninstalled configuration (FIG. 1) and in an installed configuration (FIG. 2). The flashover protection cover 10 includes an elongated flexible panel 12 that defines a longitudinal direction (indicated by arrow 13). The flashover protection cover 10 has opposite first and second surfaces 12a, 12b, and generally parallel, opposite first and second edge portions 14a, 14b, as illustrated. The first and second edge portions 14a, 14b are configured to be joined together such that the first surface 12a forms a longitudinally extending chamber 16 (FIG. 2) configured to enclose an electrical conductor 20, or other structure, that extends along the longitudinal direction 13. The second surface 12b forms an outer surface of the flashover protection cover 10.

In the illustrated embodiment, edge portion 14b is configured to removably receive edge portion 14a therewithin. Edge portion 14a has an "arrowhead" configuration with shoulder portions 15 configured to retained by elastic members 17 of edge portion 14b. The illustrated embodiment provides means for maintaining the panel edge portions 14a, 14b joined together under adverse conditions, while allowing the cover to be removed, if necessary, at a later time.

Still referring to FIGS. 1–2, a wall or creepage extender 22 is connected to the panel inner surface 12a adjacent the first edge portion 14a, as illustrated. The creepage extender 22 is preferably configured to be longitudinally coextensive with the first chamber 16 when the panel edge portions 14a, 14b are joined together. The creepage extender 22 has a free edge portion 22b that is generally parallel with the first edge portion 14a, as illustrated. The creepage extender 22 is designed to retain any electrical flashover or arcing from the conductor 20 within the longitudinally extending chamber 16.

Flashover protection covers that may be installed via hand-held devices according to the present invention may have various shapes, sizes and configurations, and are not limited to the illustrated flashover protection cover of FIGS. 1 and 2. Flashover protection covers are conventionally formed from polymeric materials of high dielectric strength, including, but not limited to, medium and high density polyethylene, and natural and synthetic rubber.

However, flashover protection covers formed from virtually any type of material may be installed via hand-held devices according to the present invention.

Flashover Protection Cover Installation Apparatus

Referring now to FIGS. 3–9, a hand-held apparatus 40 for installing a flashover protection cover 10 around an energized electrical conductor 20 (or other equipment or structure portion) according to an embodiment of the present invention, is illustrated. The hand-held apparatus 40 includes a rigid frame or plate 42 that has opposite first and second sides 42a, 42b. A guide assembly 44 is secured to the first side 42a of the plate 42 and a handle 90 is secured to the second side 42b of the plate 42.

It is understood that hand-held devices according to the present invention are not limited to having the illustrated flat plate 42. A rigid frame having virtually any shape and/or configuration may be utilized to secure the guide assembly 44 and handle 90 thereto, in accordance with the present invention. For example a rigid frame having an angled configuration may be utilized within the spirit and intent of the present invention.

Figure 4:
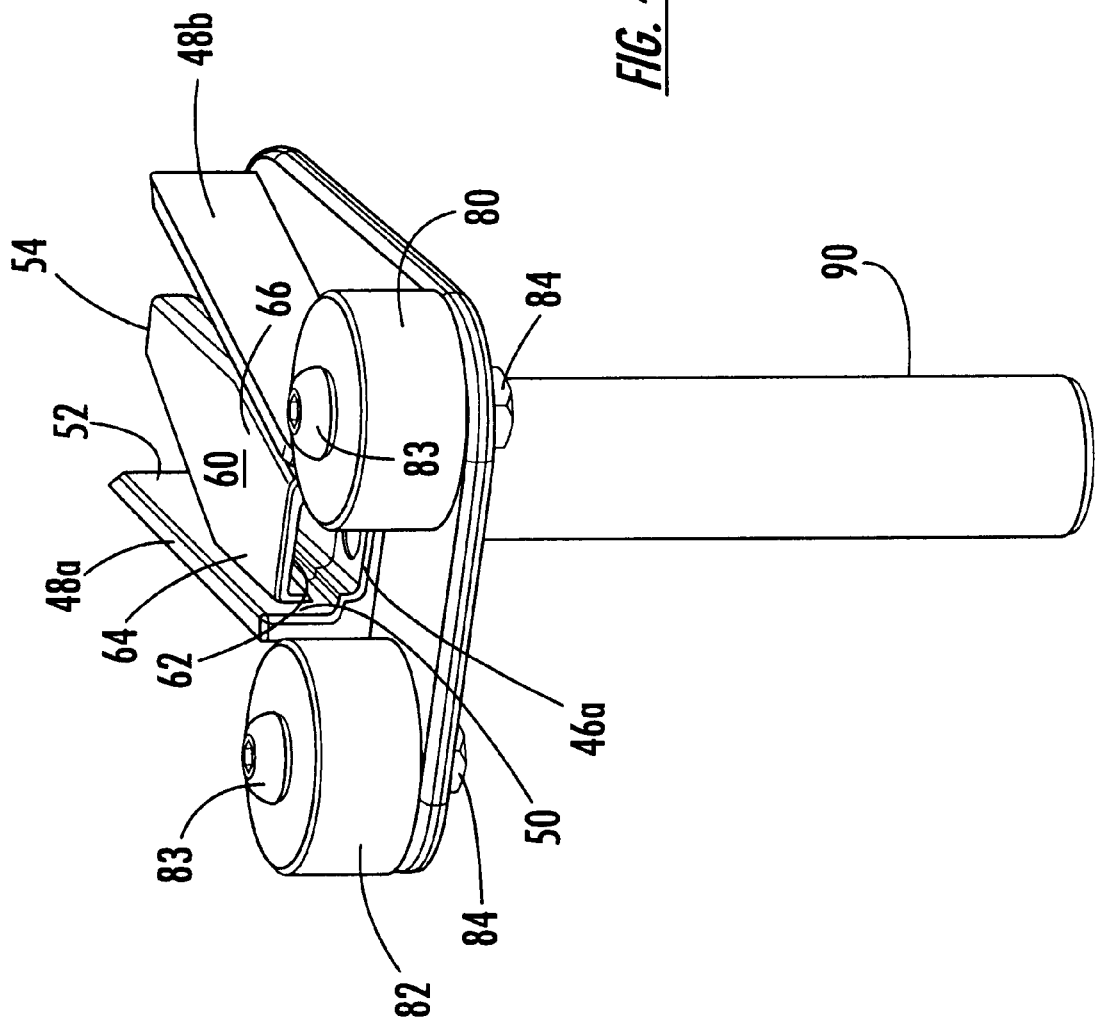
FIG. 4 is a rear perspective view of the hand-held device of FIG. 3 illustrating the guide assembly outlet.

The illustrated guide assembly 44 includes an elongated bottom wall 46 having opposite first and second ends 46a, 46b. A pair of spaced-apart, elongated side walls 48a, 48b extend upwardly from the bottom wall 46, as illustrated. The elongated side walls 48a, 48b converge towards the elongated bottom wall first end 46a to define a guide assembly outlet 50 (FIG. 4). The elongated side walls 48a, 48b diverge towards the elongated bottom wall second end 46b to define a guide assembly inlet 52 (FIG. 4).

The illustrated guide assembly 44 also includes a partition 54, the function of which is to help align the various portions of a flexible panel 12 passing through the guide assembly 44 during installation of a cover. As will be described below, the illustrated partition 54 helps align the first and second edge portions 14a, 14b of a flexible panel 12 for engagement. In addition, the partition 54 helps prevent the creepage extender 22 from becoming entangled with the second edge portion 14b during cover installation. Preferably, the partition 54, the bottom wall 46 and the side walls 48a, 48b of the guide assembly 44 are formed from non-conductive materials having good machinability and wear resistance. Exemplary materials include, but are not limited to, DELRIN® brand materials and TEFLON® brand materials.

The partition 54 includes a base member 56 that extends upwardly from the bottom wall 46 between the elongated side walls 48a, 48b, as illustrated. An elongated top wall 58 is transversely connected to the base member 56 so as to be maintained in spaced-apart relationship with the bottom wall 46. The top wall 58 and bottom wall 46 may be in parallel or non-parallel spaced-apart relationship. The top wall 58 includes opposite upper and lower surfaces 60, 62 and opposite elongated edges 64, 66.

Figure 5:
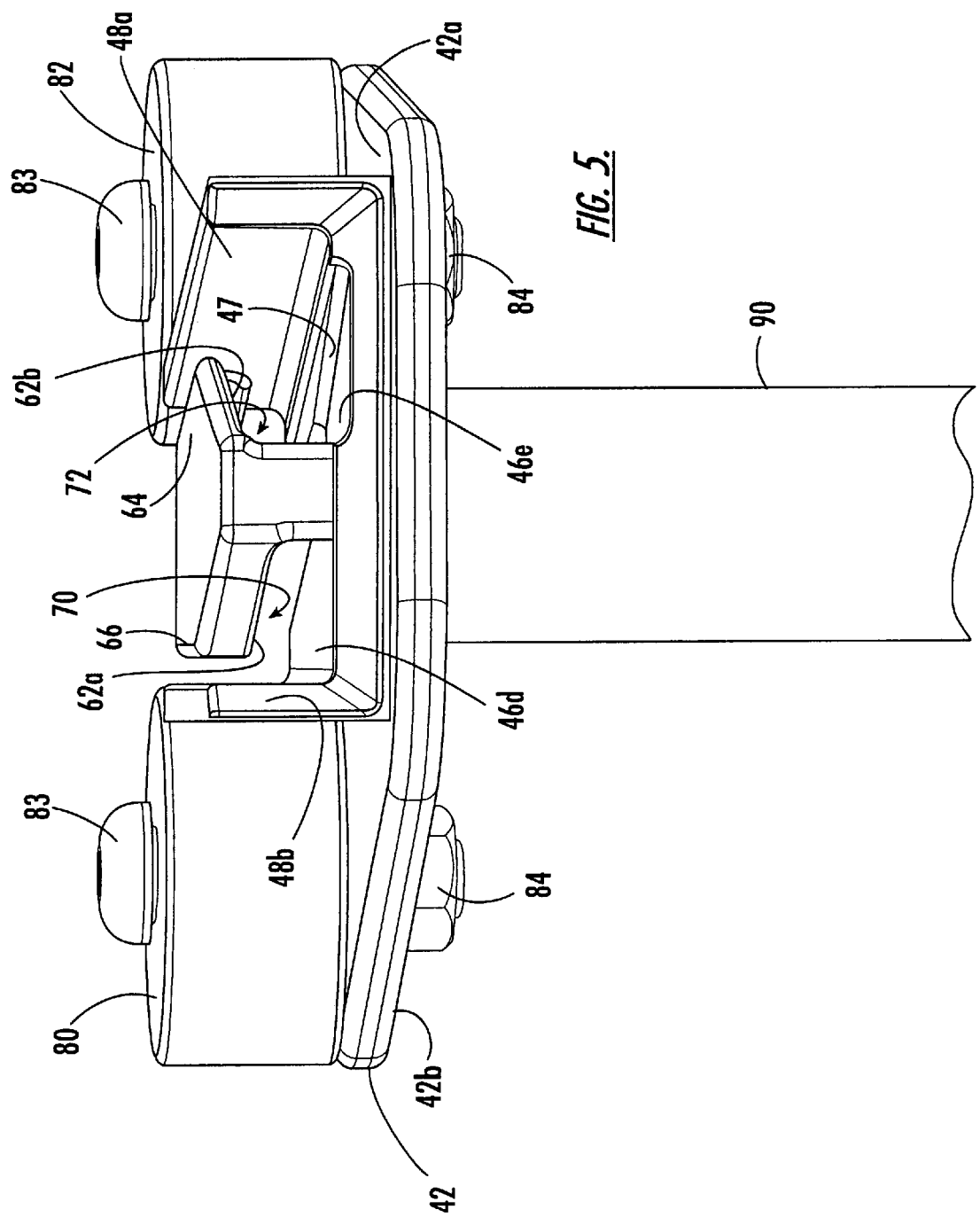
FIG. 5 is an enlarged, front perspective view of the hand-held device of FIG. 3 illustrating the guide assembly in greater detail.

As illustrated in the enlarged view of the hand-held apparatus in FIG. 5, the guide assembly 44 defines a pair of spaced-apart, converging passageways 70, 72 that are configured to slidably receive the flexible panel first and second edge portions 14a, 14b therethrough, respectively. A portion 62a of the top wall lower surface 62, a portion 46d of the bottom wall 46, and the side wall 48b define a first elongated passageway 70, as illustrated. A portion 62b of the top wall lower surface 62, a portion 46e of the bottom wall 46, and the side wall 48a define a second elongated passageway 72, as illustrated.

Figure 7:
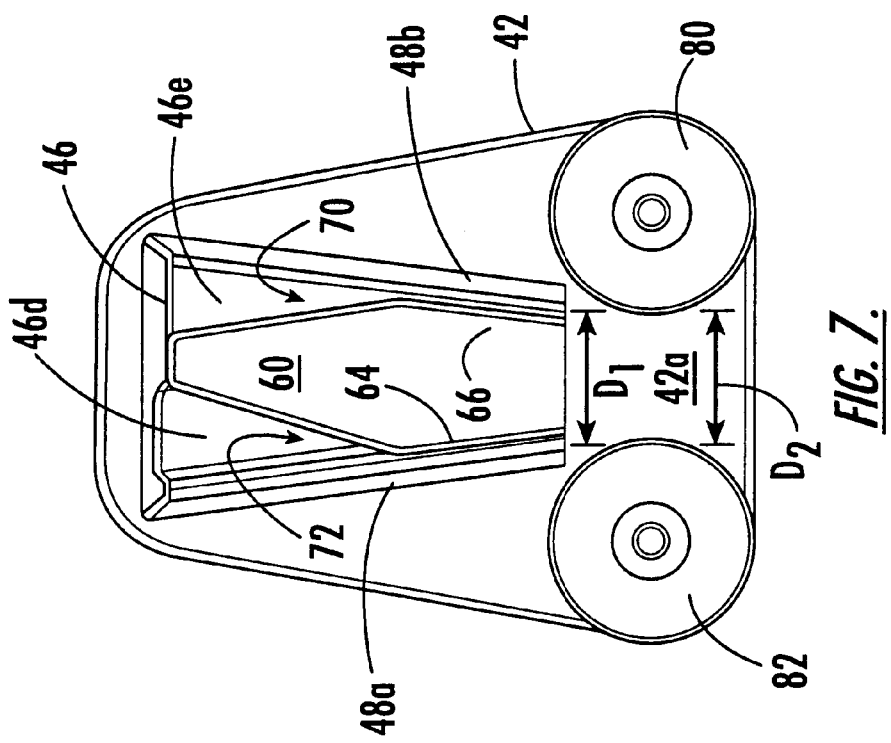
FIG. 7 is a top plan view of the hand-held device of FIG. 3.

The top wall elongated edges 64, 66 are maintained in spaced-apart relationship with the respective converging side walls 48a, 48b to permit passage therebetween of a portion of a flexible panel. Preferably, each top wall elongated edge 64, 66 is in parallel spaced-apart relationship with a respective one of the converging side walls 48a, 48b, as illustrated in FIG. 7.

Figure 6:
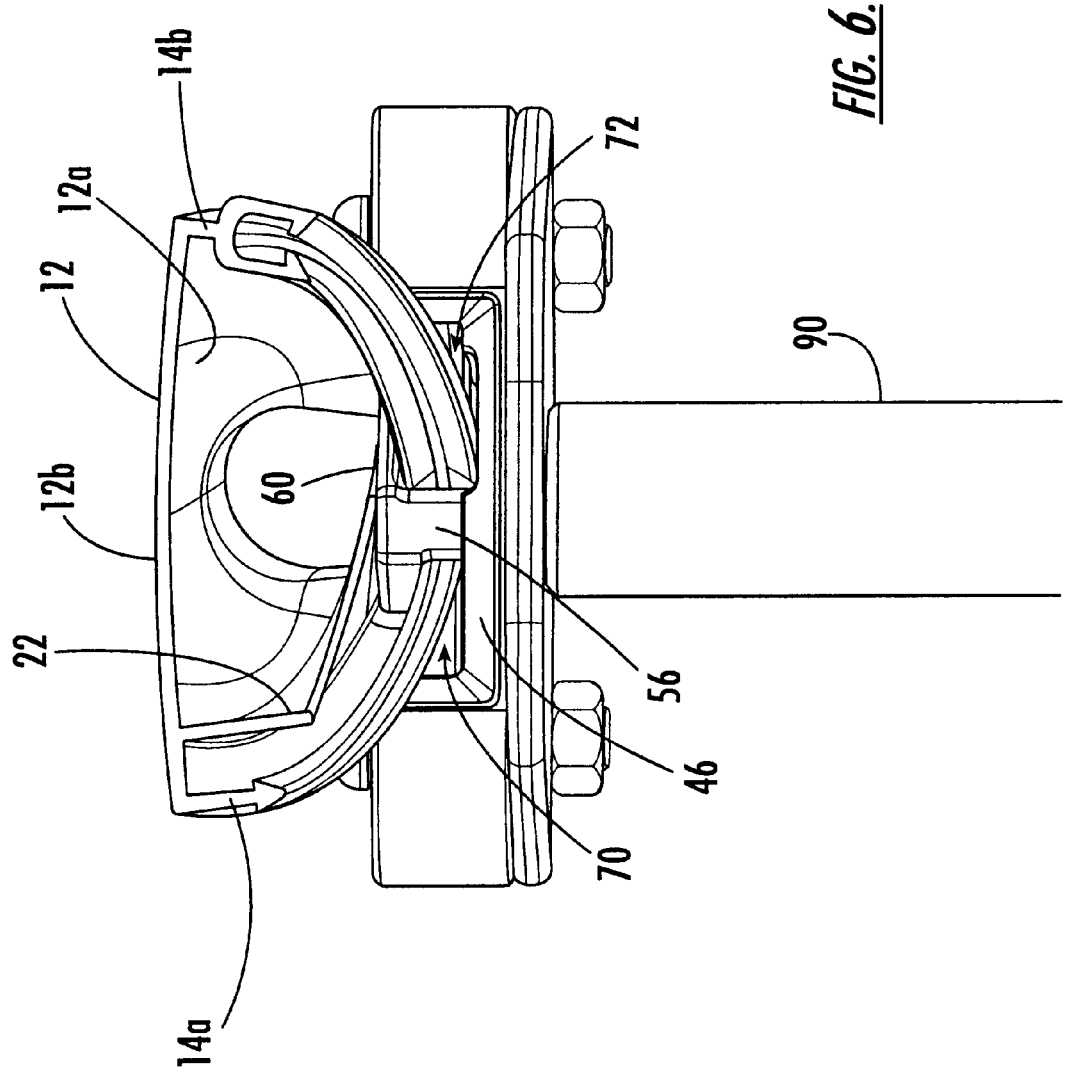
FIG. 6 is a front elevational view of the hand-held device of FIG. 3 illustrating the flashover protection cover of FIG. 1 being advanced through the guide assembly inlet.

Accordingly, as illustrated in FIG. 6, the first elongated passageway 70 is configured to slidably receive the flexible panel first edge portion 14a therethrough. The second elongated passageway 72 is configured to slidably receive the flexible panel second edge portion 14b therethrough. Preferably, the top wall upper surface 60 is configured to slidably receive the creepage extender 22 of the illustrated flexible panel 12 thereon. Thus, the guide assembly 44 is configured to join together the first and second edge portions 14a, 14b of the flexible panel 12 as the flexible panel 12 is advanced through the guide assembly 44 from the guide assembly inlet 52 to the guide assembly outlet 50.

Figure 8:
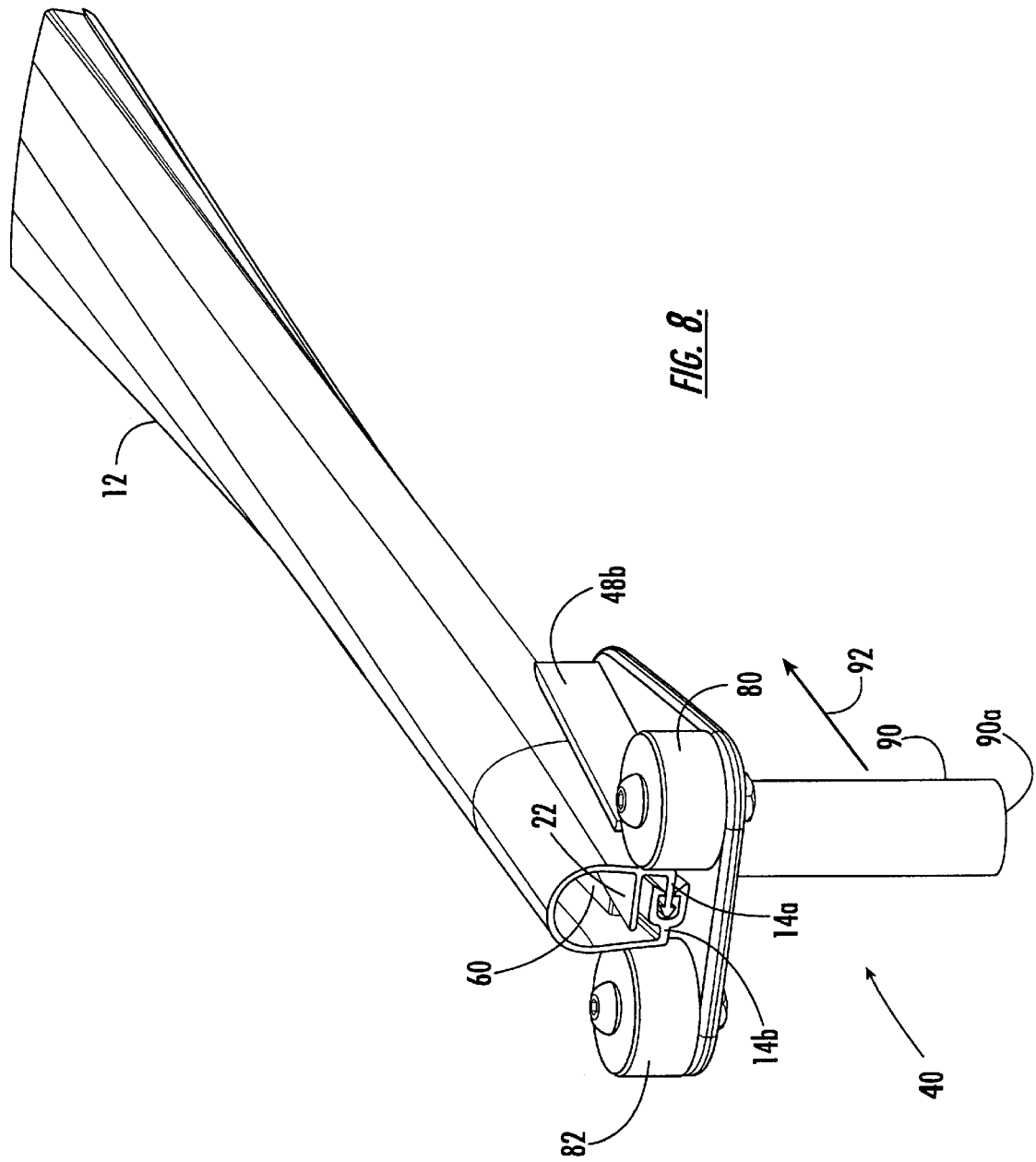
FIGS. 8 and 9 are rear perspective views of the hand-held device of FIG. 3 illustrating the flashover protection cover of FIG. 1 being advanced through the guide assembly.
Figure 9:
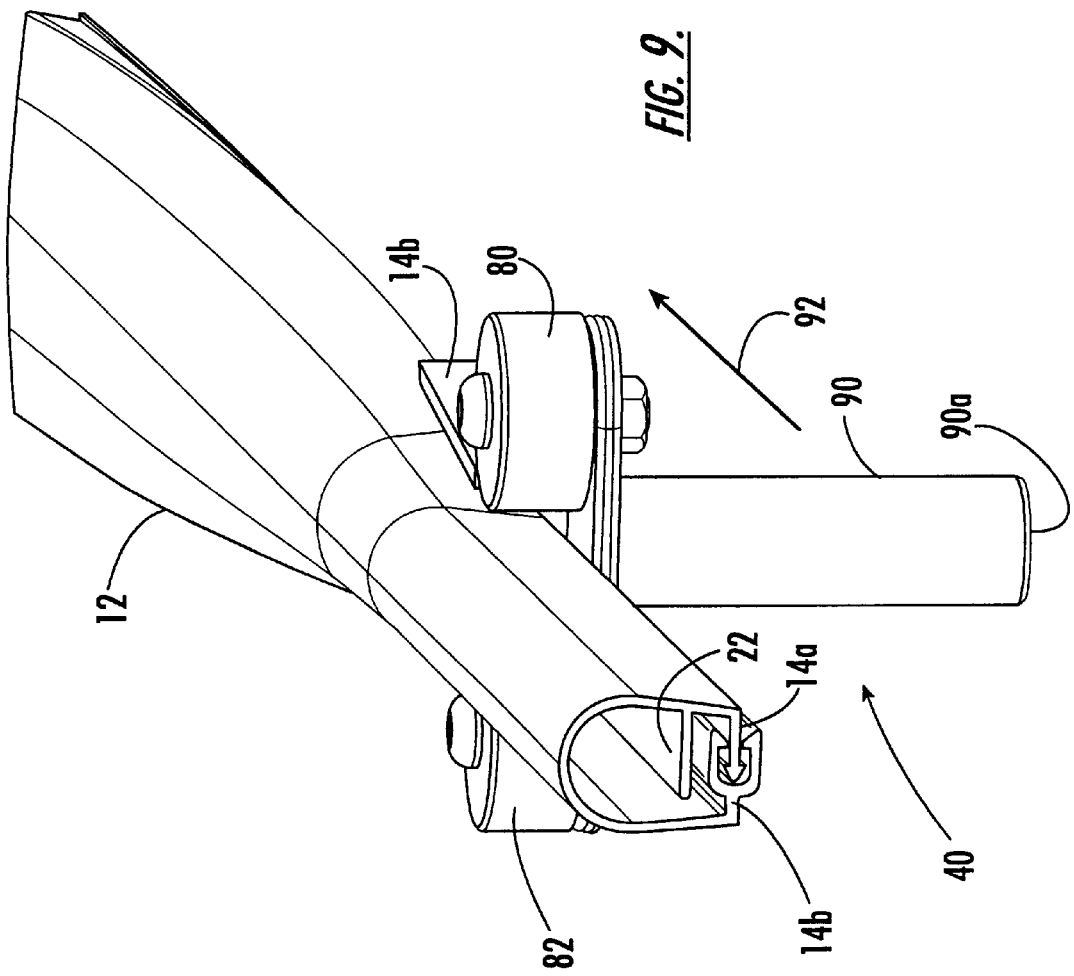

FIGS. 8 and 9 illustrate a flexible panel 12 entering the guide assembly inlet 52 and exiting via the guide assembly outlet 50 as an assembled cover 10. By grasping the handle 90 and moving the apparatus 40 along the longitudinal direction 13, relative to the flexible panel 12 (as illustrated by arrow 92), a user can quickly and easily engage the edge portions 14a, 14b thereof.

Referring back to FIG. 5, the illustrated bottom wall portion 46e of the second elongated passageway 72 includes an elongated channel 47 formed therein. The channel 47 is provided to accommodate the thicker configuration of the flexible cover second edge portion 14b relative to the first edge portion 14a so that the second edge portion 14b is properly aligned with the first edge portion 14a as the first and second edge portions 14a, 14b are joined together. It is understood that a guide assembly according to the present invention may have various configurations and shapes to accommodate flexible panels having different shapes and configurations.

Still referring to FIG. 5, a pair of spaced-apart rollers 80, 82 are rotationally mounted to the rigid plate 42, via bolt 83 and nut 84, downstream from the elongated guide assembly outlet 50, as illustrated. The rollers 80, 82 are configured to frictionally engage the cover 10 as it advances from the guide assembly outlet 50 and insure that the first and second edge portions 14a, 14b are fully joined. The rollers 80, 82 make frictional contact with the cover 10 to help ensure that the ends 14a, 14b of the flexible panel 12 are properly joined together as the cover 10 exits from the guide assembly outlet 50. The rollers 80, 82 are not driven rollers (i.e., they are "freewheeling").

Preferably, the rollers 80, 82 have a spaced-apart distance that is less than a spaced-apart distance of the converging side walls 48a, 48b at the elongated guide assembly outlet 50, as illustrated in FIG. 7. In FIG. 7, $D_1$ represents the distance between the converging side walls 48a, 48b at the guide assembly outlet 50, and $D_2$ represents the distance between the rollers 80, 82. As illustrated, $D_1$ is greater than $D_2$. In addition, the rollers 80, 82 preferably are formed from non-conductive, polymeric material, such as neoprene, that provides good frictional contact with the cover 10 exiting the guide assembly outlet 50.

The illustrated handle 90 extends outwardly from the rigid plate second side 42b. Handles having various shapes and configurations may be utilized. The present invention is not limited to the illustrated handle 90. Preferably, the handle 90 is formed from non-conductive materials including, but not limited to, DELRIN® brand materials and TEFLON® brand materials. Preferably, the free end 90a of the handle 90 is configured to be secured to a manipulator pole to facilitate remote operation of the apparatus. An exemplary manipulator device is referred to as a "hot stick" in the electrical power industry. Hot sticks are available from Hastings Fiber Glass Products, Inc., Hastings Mich. and A. B. Chance, Co., Centralia, Mo.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for installing a cover around an article, wherein the cover comprises an elongated flexible panel having generally parallel opposite first and second edge portions that are configured to be joined together to enclose the article, the apparatus comprising:
   a frame having opposite first and second sides;
   an elongated guide assembly secured to the frame first side, comprising:
      opposite first and second ends;
      a first elongated passageway configured to slidably receive the flexible panel first edge portion therethrough; and
      a second elongated passageway configured to slidably receive the flexible panel second edge portion therethrough, wherein the first and second elongated passageways converge towards the guide assembly second end;
      wherein the elongated guide assembly is configured to join together the first and second edge portions of the flexible panel as the flexible panel is advanced through the guide assembly from the guide assembly first end to the guide assembly second end; and
   a handle secured to the frame second side.

2. An apparatus according to claim 1 further comprising a pair of spaced apart rollers rotationally mounted to the frame downstream from the elongated guide assembly second end, wherein the rollers are configured to frictionally engage the cover exiting from the elongated guide assembly second end.

3. An apparatus according to claim 1 wherein the elongated guide assembly comprises:
   an elongated bottom wall having opposite first and second ends;
   a pair of spaced-apart, elongated side walls that extend upwardly from the bottom wall, wherein the elongated side walls converge towards the elongated bottom wall first end to define a guide assembly outlet and wherein the elongated side walls diverge towards the elongated bottom wall second end to define a guide assembly inlet; and
   a partition extending upwardly from the bottom wall between the elongated side walls.

4. An apparatus according to claim 3 wherein the partition comprises:
   a base member that extends upwardly from the bottom wall between the elongated side walls;
   an elongated top wall transversely connected to the base member in spaced-apart relationship with the bottom wall, wherein the top wall comprises opposite upper and lower surfaces and opposite elongated edges, wherein each elongated edge is maintained in spaced apart relationship with a respective one of the pair of converging side walls to permit passage therebetween of a portion of the flexible panel adjacent a respective edge portion thereof, wherein a first portion of the top wall lower surface and a first portion of the bottom wall define the first elongated passageway, and wherein a second portion of the top wall lower surface adjacent the top wall lower surface first portion and a second portion of the bottom wall adjacent the bottom wall first portion define the second elongated passageway.

5. An apparatus according to claim 1 wherein at least a portion of each elongated edge in spaced apart relationship with a respective one of the converging side walls is in parallel spaced apart relationship with a portion of a respective one of the converging side walls.

6. An apparatus according to claim 1 wherein the frame comprises a flat, rigid plate.

7. An apparatus according to claim 1 wherein the article is an electrical conductor.

8. A hand-held apparatus for installing a cover around an article, wherein the cover comprises an elongated flexible panel having generally parallel opposite first and second edge portions that are configured to be joined together to enclose the article, the apparatus comprising:
   a frame having opposite first and second sides;
   a guide assembly secured to the frame first side, comprising:
      an elongated bottom wall having opposite first and second ends;
      a pair of spaced-apart, elongated side walls that extend upwardly from the bottom wall, wherein the elongated side walls converge towards the elongated bottom wall first end to define a guide assembly outlet and wherein the elongated side walls diverge towards the elongated bottom wall second end to define a guide assembly inlet; and
      a partition, comprising:
         a base member that extends upwardly from the bottom wall between the elongated side walls;
         an elongated top wall transversely connected to the base member in spaced-apart relationship with the bottom wall, wherein the top wall comprises opposite upper and lower surfaces and opposite elongated edges, wherein each elongated edge is maintained in spaced apart relationship with a respective one of the pair of converging side walls to permit passage therebetween of a portion of the flexible panel adjacent a respective edge portion thereof, wherein a first portion of the top wall lower surface and a first portion of the bottom wall define a first elongated passageway configured to slidably receive the flexible panel first edge portion therethrough, and wherein a second portion of the top wall lower surface adjacent the top wall lower surface first portion and a second portion of the bottom wall adjacent the bottom wall first portion define a second elongated passageway configured to slidably receive the flexible panel second edge portion therethrough;
      wherein the elongated guide assembly is configured to join together the first and second edge portions of the flexible panel as the flexible panel is advanced through the guide assembly from the guide assembly inlet to the guide assembly outlet; and
   a pair of spaced-apart rollers rotationally mounted to the frame downstream from the elongated guide assembly outlet, wherein the rollers have a spaced-apart distance less than a spaced-apart distance of the converging side walls at the elongated guide assembly outlet.

9. A hand-held apparatus according to claim 8 wherein at least a portion of each elongated edge in spaced apart relationship with a respective one of the converging side walls is in parallel spaced apart relationship with a portion of a respective one of the converging side walls.

10. A hand-held apparatus according to claim 8 wherein the first portion of the bottom wall that defines the first elongated passageway comprises an elongated channel formed therein.

11. A hand-held apparatus according to claim 8 wherein the frame comprises a flat, rigid plate.

12. A hand-held apparatus according to claim 8 further comprising a handle extending from the frame second side.

13. A hand-held apparatus according to claim 12 further comprising means for securing the handle to a manipulator pole to facilitate remote operation of the apparatus.

14. A hand-held apparatus according to claim 8 wherein the article is an electrical conductor.

15. A hand-held apparatus for installing a cover around an article, wherein the cover comprises an elongated flexible panel having opposite first and second surfaces, generally parallel opposite first and second edge portions that are configured to be joined together to enclose the article, and a wall having a free end extending from the flexible panel first surface adjacent the first edge portion, the apparatus comprising:
- a frame having opposite first and second sides;
- a guide assembly secured to the frame first side, comprising:
  - an elongated bottom wall having opposite first and second ends;
  - a pair of spaced-apart, elongated side walls that extend upwardly from the bottom wall, wherein the elongated side walls converge towards the elongated bottom wall first end to define a guide assembly outlet and wherein the elongated side walls diverge towards the elongated bottom wall second end to define a guide assembly inlet; and
  - a partition, comprising:
    - a base member that extends upwardly from the bottom wall between the elongated side walls;
    - an elongated top wall transversely connected to the base member in spaced-apart relationship with the bottom wall, wherein the top wall comprises opposite upper and lower surfaces and opposite elongated edges, wherein the top wall upper surface is configured to slidably receive the flexible cover wall thereon, wherein each elongated edge is maintained in spaced apart relationship with a respective one of the pair of converging side walls to permit passage therebetween of a portion of the flexible panel adjacent a respective edge portion thereof, wherein a first portion of the top wall lower surface and a first portion of the bottom wall define a first elongated passageway configured to slidably receive the flexible panel first edge portion therethrough, and wherein a second portion of the top wall lower surface adjacent the top wall lower surface first portion and a second portion of the bottom wall adjacent the bottom wall first portion define a second elongated passageway configured to slidably receive the flexible panel second edge portion therethrough;
  - wherein the elongated guide assembly is configured to join together the first and second edge portions of the flexible panel as the flexible panel is advanced through the guide assembly from the guide assembly inlet to the guide assembly outlet; and
- a pair of spaced-apart rollers rotationally mounted to the frame downstream from the elongated guide assembly outlet, wherein the rollers have a spaced-apart distance less than a spaced-apart distance of the converging side walls at the elongated guide assembly outlet.

16. A hand-held apparatus according to claim 15 wherein at least a portion of each elongated edge in spaced apart relationship with a respective one of the converging side walls is in parallel spaced apart relationship with a portion of a respective one of the converging side walls.

17. A hand-held apparatus according to claim 15 wherein the first portion of the bottom wall that defines the first elongated passageway comprises an elongated channel formed therein.

18. A hand-held apparatus according to claim 15 wherein the frame comprises a flat, rigid plate.

19. A hand-held apparatus according to claim 15 further comprising a handle extending from the frame second side.

20. A hand-held apparatus according to claim 19 further comprising means for securing the handle to a manipulator pole to facilitate remote operation of the apparatus.

21. A hand-held apparatus according to claim 15 wherein the article is an electrical conductor.

22. A method of installing a cover around an article, wherein the cover comprises an elongated flexible panel having generally parallel opposite first and second edge portions that are configured to be joined together to enclose the article, the method comprising the steps of:
- surrounding the article with the flexible panel; and
- joining together the opposite first and second edge portions of the flexible panel using a hand-held apparatus comprising:
  - a frame having opposite first and second sides;
  - an elongated guide assembly secured to the frame first side, comprising:
    - opposite first and second ends;
    - a first elongated passageway configured to slidably receive the flexible panel first edge portion therethrough; and
    - a second elongated passageway configured to slidably receive the flexible panel second edge portion therethrough, wherein the first and second elongated passageways converge towards the guide assembly second end;
    - wherein the elongated guide assembly is configured to join together the first and second edge portions of the flexible panel as the flexible panel is advanced through the guide assembly from the guide assembly first end to the guide assembly second end; and
  - a handle secured to the frame second side.

23. A method according to claim 22 further comprising a pair of spaced apart rollers rotationally mounted to the frame downstream from the elongated guide assembly second end, wherein the rollers are configured to frictionally engage the cover exiting from the elongated guide assembly second end.

24. A method according to claim 22 wherein the elongated guide assembly comprises:
- an elongated bottom wall having opposite first and second ends;
- a pair of spaced-apart, elongated side walls that extend upwardly from the bottom wall, wherein the elongated side walls converge towards the elongated bottom wall first end to define a guide assembly outlet and wherein the elongated side walls diverge towards the elongated bottom wall second end to define a guide assembly inlet; and
- a partition extending upwardly from the bottom wall between the elongated side walls.

25. A method according to claim 24 wherein the partition comprises:
- a base member that extends upwardly from the bottom wall between the elongated side walls;
- an elongated top wall transversely connected to the base member in spaced-apart relationship with the bottom wall, wherein the top wall comprises opposite upper and lower surfaces and opposite elongated edges, wherein each elongated edge is maintained in spaced apart relationship with a respective one of the pair of converging side walls to permit passage therebetween of a portion of the flexible panel adjacent a respective edge portion thereof, wherein a first portion of the top wall lower surface and a first portion of the bottom wall define the first elongated passageway, and wherein a second portion of the top wall lower surface adjacent the top wall lower surface first portion and a second portion of the bottom wall adjacent the bottom wall first portion define the second elongated passageway.

26. A method according to claim 22 wherein at least a portion of each elongated edge in spaced apart relationship with a respective one of the converging side walls is in parallel spaced apart relationship with a portion of a respective one of the converging side walls.

27. A method according to claim 22 wherein the frame comprises a flat, rigid plate.

28. A method according to claim 22 wherein the article is an electrical conductor.

* * * * *